United States Patent [19]

Anders et al.

[11] Patent Number: 4,653,602
[45] Date of Patent: Mar. 31, 1987

[54] ELECTRIC MOTOR DRIVEN RACK AND PINION STEERING GEAR WITH TAKE-OFF FROM AXIALLY SLIDABLE NUT

[75] Inventors: William S. Anders; Steven J. Hallman, both of Saginaw, Mich.

[73] Assignee: General Motors Corporation, Detroit, Mich.

[21] Appl. No.: 788,477

[22] Filed: Oct. 17, 1985

[51] Int. Cl.$^4$ ............................................. B62D 5/04
[52] U.S. Cl. ................................. 180/79.1; 74/388 PS
[58] Field of Search .................... 180/79.1; 74/388 PS, 74/498, 388 R

[56] References Cited

U.S. PATENT DOCUMENTS

| | | | |
|---|---|---|---|
| 2,756,605 | 7/1956 | Lincoln et al. | 74/388 PS |
| 2,869,383 | 1/1959 | Rapp | 74/388 PS |
| 3,511,104 | 5/1970 | Piat | 74/388 PS |
| 3,716,110 | 2/1973 | Fonda | 74/388 PS |
| 4,409,503 | 10/1983 | Barthelemy | 74/388 R |
| 4,415,054 | 11/1983 | Drutchas | 180/79.1 |
| 4,572,314 | 2/1986 | Anguera | 180/79.1 |
| 4,577,715 | 3/1986 | Saito | 180/79.1 |

FOREIGN PATENT DOCUMENTS

| | | | |
|---|---|---|---|
| 52-35035 | 3/1977 | Japan | 180/79.1 |
| 55-44058 | 3/1980 | Japan | 180/79.1 |
| 59-227561 | 12/1984 | Japan | 180/79.1 |

Primary Examiner—John J. Love
Assistant Examiner—Charles Watts
Attorney, Agent, or Firm—Charles R. White

[57] ABSTRACT

An electric power assisted rack and pinion steering gear for steering the dirigible wheels of a vehicle comprising a rack housing with an end mounted electric motor which rotatably drives a ball nut screw on which a ball nut is mounted for linear movement; the ball nut is mounted in the gear housing and is attached to manually driven rack and provides a carrier forming steering gear output to the tie rods connected to the dirigible wheels of the vehicle.

8 Claims, 4 Drawing Figures

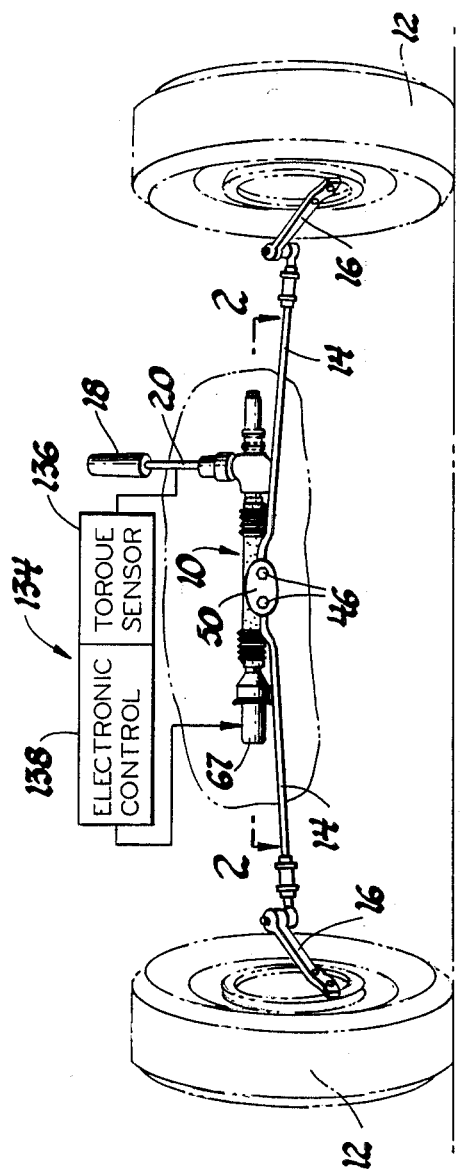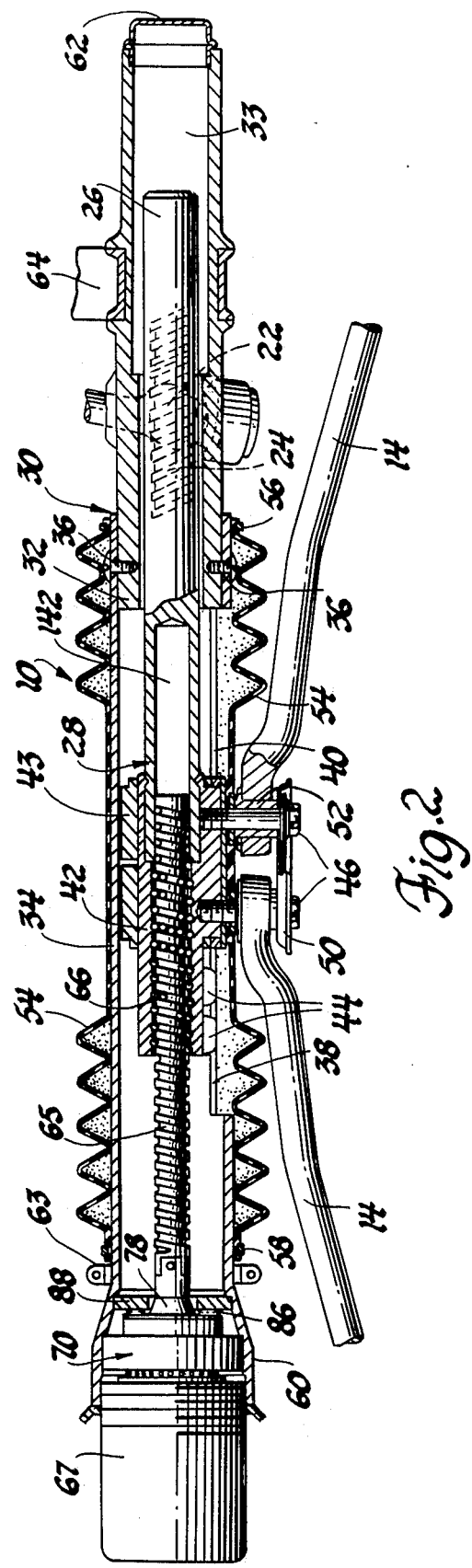

ELECTRIC MOTOR DRIVEN RACK AND PINION STEERING GEAR WITH TAKE-OFF FROM AXIALLY SLIDABLE NUT

This invention relates to vehicle power assist steering and more particularly to a new and improved rack and pinion steering gear featuring an electric drive motor disposed concentric to and at one end of the gear housing to rotatably drive a screw and thereby linearly drive a nut and rack assembly as an output to provide electric power assist steering.

Prior to the present invention, various rack and pinion steering gears have incorporated electric motors for power assist steering effectively reducing steering effort and improving driver comfort. These prior designs while generally providing good steering assist benefits are generally complex and bulky constructions and are difficult to build and repair. The prior designs further do not provide for center take-off utilized in many vehicles particularly compact front-wheel-drive vehicles requiring "high mount" of the gear to the front compartment cowling or other support structure. Furthermore, the prior designs do not effectively rotatably power the screw to linearly drive a ball nut which effectively serves as a carrier or output for moving the tie rods and the associated dirigible wheels of the vehicle.

In contrast to prior designs, the present invention preferably utilizes a discrete and substantially conventional ball nut screw rotatably driven by an electric motor preferably end mounted to the housing assembly of the rack and pinion gear. This screw extends through and carries a linearly movable ball nut that forms an output of this unit. The ball nut is also drivingly attached to a rack mechanically moved in translation by the operator through an associated pinion. The components of this invention are easily accessible and are readily repairable or replaceable usually without dismantling the steering gear proper or requiring the substantial tear down and rebuild of the gear. The motor driven rotatable screw of this steering gear is adapted to telescope into a hollowed out portion of the rack to foreshorten the design for improved compactness and adaptability to a wide range of vehicle installations.

Among the distinctive characteristics of the present invention as compared to prior art electric power steering systems is the incorporation of a planetary speed reducing and torque increasing mechanism, which may be either a set of involute gears or a traction drive, for driving a ball nut screw. In this invention, a center take-off is provided by the ball nut mounted on the screw and is operatively connected to one end of the rack. Also an electric motor is secured to one end of the rack and pinion housing assembly to provide assist through the planetary reduction mechanism coaxially oriented with the motor and ball nut screw. The output of the planetary unit is converted from angular ball screw motion to linear translation by the rack and ball nut assembly. Furthermore, this invention involves an electric motor which threads into the end of the housing to provide both mechanical retention and establish bearing preload. With this invention backlash between the electric motor and the screw actuator can be reduced or eliminated with the planetary drive or gear set reduction as opposed to spur gear reductions. Gear noise is also greatly reduced. With this invention, the steering gear can be substantially reduced in cost and improved since a major portion of the housing can be of tubular steel stock forming an extension that is readily attached to a cast aluminum main housing. In this composite housing, the steel stock is easily pinned or otherwise attached to the end of the aluminum housing and can be formed or cut with a track so that the nut of the ball nut and screw assembly can be used as a carrier which moves in translation in the track upon rotation of the screw.

A main advantage of the present invention over conventional electric power systems is a redistribution and reduction of volume generally required by electric power assisted gears. In many cases, the concentric and end mounted motor design permits installation of electric power steering where an axially perpendicular electric motor or a concentric motor disposed around a center portion of the gear housing would be unduly bulky and would simply be unsuitable for vehicle application.

In a preferred embodiment of the present invention, an electric drive motor is threadedly and concentrically mounted at one end of the steering gear housing with a selectively reversible output through planetary gearing which rotatably drives a ball nut screw through the carrier of the planetary gearing. The ball nut screw unit extends through the ball nut and is drivingly connected thereto by a conventional ball train and is linearly driven in response to powered rotation of the screw. The screw further telescopes into the interior of the rack to foreshorten the unit. A toothed section of the rack, which is attached at one end to the ball nut, meshes with a pinion gear that is rotatably driven from the steering shaft by vehicle operator through a conventional steering wheel and shaft. The ball nut provides a linear sliding carrier connected to the tie rods for turning the dirigible wheel of the vehicle. A control system senses the direction and torque load from the vehicle operator to control direction and output of the motor for effective power assist steering. With this design, a foreshortened and low profile is effectively provided preferably with a center take-off for a wide range of vehicle applications.

It is a feature, object and advantage of this invention to provide a new and improved electrically driven power assist rack and pinion steering gear incorporating a discrete, rotatably-driven screw which drives a nut in a linear path that forms part of a nut and rack assembly with the screw being operatively connected to a reversible drive motor and with the nut being operatively connected to mechanical input through a pinion driven rack that is manually moved in translation by the vehicle operator.

It is another feature, object and advantage of this invention to provide a new and improved electric power assist rack and pinion steering gear having a concentric end mount motor driving a ball nut screw on which the ball nut is operatively mounted for movement in a linear path and is connected to a manually powered rack and provides the carrier for a center take off attached by tie rods to the steerable wheels of the vehicle.

These and other features, objects and advantages of this invention will be more apparent from the following detailed description and drawing in which:

FIG. 1 is a front elevational view of the electric power-assisted rack and pinion steering gear of this invention.

FIG. 2 is an enlarged view partially in cross-section taken generally along lines 2—2 of FIG. 1.

Figure 3:
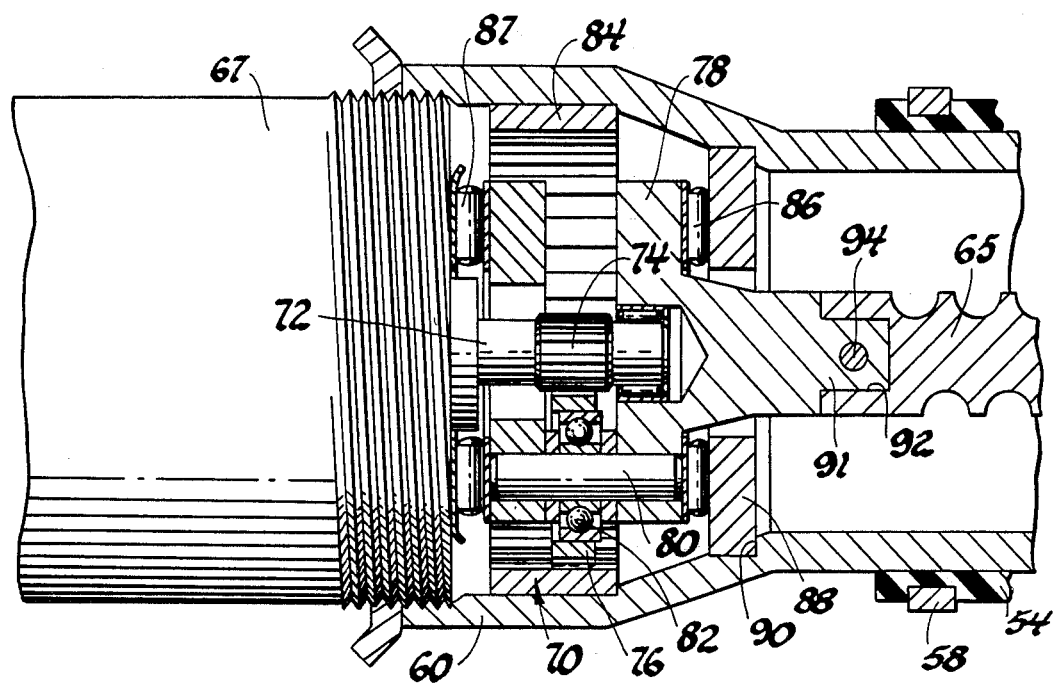
FIG. 3 is a further enlarged view partly in section of the electric drive motor and a planetary drive system of the rack and pinion steering gear of this invention.

Turning now in greater detail to the drawing, there is shown in FIG. 1 a rack and pinion steering gear 10 operatively connected to a pair of dirigible road wheels 12 by tie rod assemblies 14 and by steering arms 16. The steering gear 10 has mechanical input through a steering shaft assembly 18 that incorporates a torsion bar 20 adapted to be turned by a vehicle operator through a conventional steering wheel, not illustrated. The steering shaft assembly 18 is drivingly connected to a pinion gear 22 operatively mounted in the gear housing described below. The teeth of the pinion gear mesh with the teeth 24 of an elongated rack 26 forming part of a ball nut and rack assembly 28 that is mounted for linear sliding movement in a composite housing assembly 30. This housing assembly includes a cast aluminum main housing 32 with a cylindrical passage 33 therethrough and a tubular steel extension 34 attached to the main housing by threaded fasteners 36. With this rack and pinion arrangement, rotation of the pinion gear 22 by the vehicle operator through the steering shaft assembly will cause lateral sliding movement of the ball nut rack assembly 28 to the left or right direction within the housing assembly according to the direction of steering input to effect selected steering of the road wheels 12 with or without power assist. The tubular extension 34 of the steering gear housing assembly has an elongated rectilinear opening 38. The side edges 40 of which form laterally spaced tracks for the ball nut 42 of the ball nut and rack assembly 28. The ball nut has projections 44 extending radially therefrom which fit between the tracks for rotational retention and linear guidance of the ball nut 42. A support slide 43 is fixed to the nut and rack assembly for supporting these elements in the tubular extension.

The ball nut 42 of this assembly provides a slidable and nonrotatable center take off carriage operating with low friction in the track 40. The inboard ends of the tie rods 14 are operatively connected to the ball nut 42 by bolts 46. As shown in FIG. 2, the bolts project through a front plate 50 and cylindrical bushings 52 in the ends of the tie rods into threaded connection with the ball nut 42. An elongated convoluted boot 54 of elastomeric material stretches over the housing from end clamp 56 adjacent to the pinion gear 22 to an end clamp 58 adjacent to an enlarged end 60 of the tubular extension 34. With this boot and with an end cover 62 mounted in the open end of the main housing 32, the internal components of the steering gear are enclosed and protected from outside dirt, moisture and other foreign elements. The housing assembly is attached to a forward bulkhead of the vehicle by conventional clamps 63, 64.

In addition to manual sliding input from the operator driven rack, the ball nut 42 is driven by an elongated ball nut screw 65 with a conventional ball train 66 drivingly interconnecting these members. The ball nut screw is driven by of an electric motor 67 which is adjustably threaded into the cylindrical and enlarged end 60 of the tubular extension 34. To reduce speed and increase the torque of the electric motor, a planetary gear set 70 is drivingly interconnected between the motor 67 and the ball nut screw 65. As shown in FIG. 3, the motor 67 has an output shaft 72 on which sun gear 74 is mounted. This sun gear meshes with planetary gears 76 that and operatively mounted on carrier 78 by pins 80 and bearings 82. The planetary gears 76 mesh with a ring gear 84 press-fitted or otherwise fixed for reaction in enlarged end 60 of the housing extension 34.

Thrust bearings 86 are operatively disposed between the inboard side of the carrier 78 and a thick washer-like spacer 88 located on an internal shoulder 90. Thrust bearing 87 is mounted between the carrier and the end face of the motor. With this arrangement, a selected preload can be applied by screwing the motor into or out of the enlarged end 60 of the housing extension 34.

With this planetary arrangement, there is geared speed reduction and increased torque from the motor to the rotatably driven ball nut screw 65 via the carrier output which includes a polygonal drive extension 91 fitted into a socket 92 in the end of the screw 65. This connection is further secured by pin 94.

Figure 4:
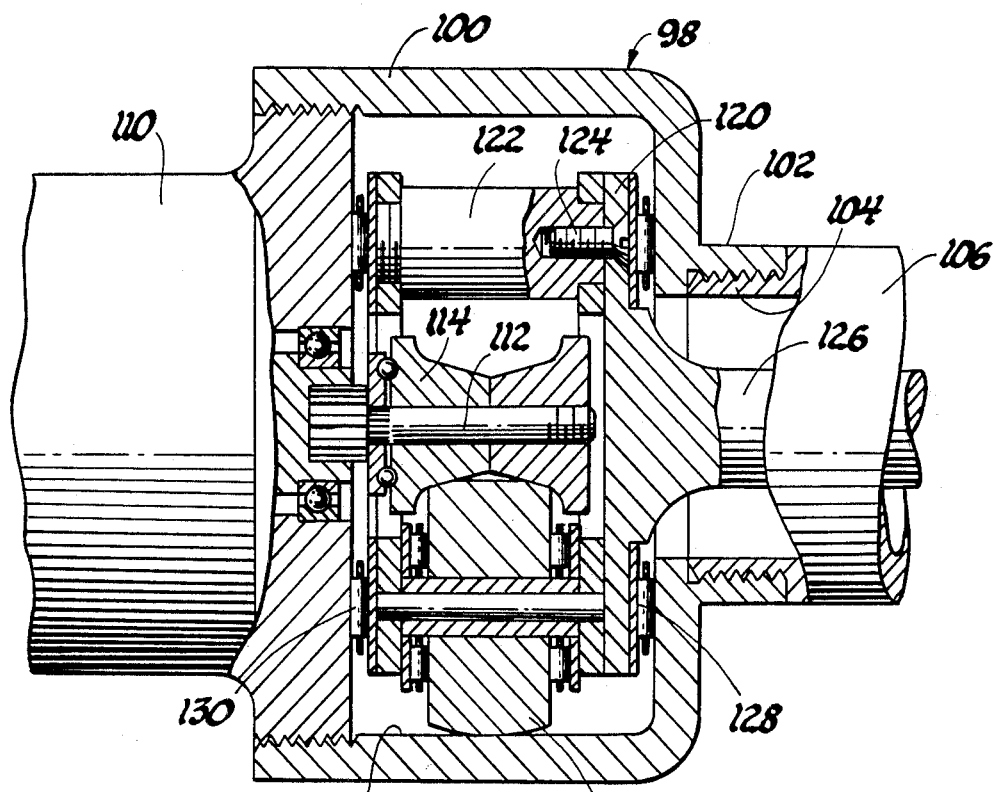
FIG. 4 is a view similar to the view of FIG. 3 but illustrating a second embodiment of the planetary drive of this invention.

In FIG. 4 a unit 98 is provided which includes an enlarged housing 100 having a neck 102 internally threaded and screwed on the outer threaded end 104 of tubular extension 106 which corresponds to extension 34 of FIGS. 2 and 3. Electric motor 110 threaded into housing 100 has an output shaft 112 which drives a sun element 114 which drives the planetary elements 116 which walk on the inside wall 118 of the housing 100 that provides the reaction element for this planetary unit. The planets are operatively mounted on a carrier assembly 120 which includes cylindrical spacers 122 connected by screws 124 to the output shaft 126 of the carrier assembly 120 that is drivingly connected to the end of the ball nut screw as described in connection with FIG. 2. The thrust bearings 128, 130 are as previously described in connection with FIG. 3 with motor 110 adjustably threaded into the housing 100 for preload.

Suitable steering assist controls 134 include a torque sensor 136 which picks up steering direction and effort from torsion bar 20. This provides input to the electronic control 138 that energizes the electric motor 67 or 110 for direction and output. The ball nut and screw has left hand threading so that counter-clockwise rotation of the motor provide for telescoping of the screw into the elongated recess 142 in the rack to foreshorten the overall length of the design. When mechanical steering effort is terminated input torque is terminated so that power assisted steering is accordingly terminated. If the hand wheel is released, the geometry of the steering linkage system will return the steering wheels to the straight ahead position. If desired, the ball nut and screw can be replaced by a nut and screw with meshing threads.

While a preferred embodiment of this invention has been illustrated, other embodiments will now become more apparent to those skilled in the art. Accordingly, these embodiments are intended to be uncovered by the following claims.

The embodiments of the invention in which an exclusive property or privilege is claimed are defined as follows:

1. A power assisted rack and pinion steering gear for steering the dirigible wheels of a vehicle comprising a rack housing, an elongated steering gear rack disposed for linear movement within said housing, a rotatable pinion gear turned by a vehicle operator and operatively meshing with the rack providing a manual input for linearly moving said rack, connector means operatively connecting said rack with the dirigible wheels of the vehicle for steering said wheels in response to the linear movement of said rack, said connector means including tie rod means operatively connected to said wheels and a nut mounted in said housing adjacent to one end of said rack and operatively secured thereto for linear movement therewith, an elongated rotatable screw operatively extending into said nut, an electric motor means mounted at one end of said housing and operatively connected to one end of said screw for the rotatable electric power drive of said screw to thereby linearly move said nut and move said tie rods in response to predetermined mechanical input applied to said pinion gear by said vehicle operator for power assist steering of said wheels.

2. A power assisted rack and pinion steering gear for steering the dirigible wheels of a vehicle comprising a rack housing, an elongated steering gear rack disposed for linear movement within said housing, a pinion gear rotatably operated by a vehicle operator and operatively meshing with the rack providing a manual input for linearly moving said rack, connector means operatively connecting said rack with the dirigible wheels of the vehicle for steering said wheels in response to the linear movement of said rack, said connector means including a ball nut slidably mounted in said housing and drivingly connected to one end of said rack and linearly movable therewith, an elongated rotatable ball nut screw operatively extending into said nut, ball train means drivingly interconnecting said ball nut screw to said ball nut, an electric motor means mounted at one end of said housing operatively connected to an end portion of said ball nut screw for rotatably driving said ball nut screw to thereby linearly move said ball nut in response to predetermined mechanical input applied to said pinion gear by said vehicle operator for power assist steering.

3. The steering gear defined in claim 2 wherein said housing has an internally threaded open end and wherein said motor is threaded into said open end of said housing.

4. The steering gear defined in claim 3 wherein a planetary unit is interposed between said motor and said screw to reduce input speed to said screw while increasing input torque.

5. A power assisted rack and pinion steering gear for steering the dirigible wheels of a vehicle comprising an elongated rack housing, an elongated steering gear rack disposed for linear movement within said housing, a pinion gear rotatably driven by a vehicle operator and operatively meshing with the rack for mechanically and linearly moving said rack, ball nut means operatively connected with said rack and linearly moved therewith, linkage means operatively connecting said ball nut means to the dirigible wheels of the vehicle for vehicle steering, said ball nut means being rigidly secured to said rack, rotatable ball screw means operatively extending into said ball nut means and extending into said rack, and ball train means operatively interconnecting said ball nut and screw means, and electric motor means mounted to one end of said rack housing for rotatably driving said ball nut screw means to linearly move said nut in response to predetermined mechanical force applied to said pinion gear by said vehicle operator to thereby effect power assist steering.

6. A power assisted rack and pinion steering gear for steering the dirigible wheels of the vehicle comprising a hollowed rack housing, an elongated steering gear rack disposed for linear movement within said housing, a pinion gear rotatably driven by a vehicle operator and operatively meshing with the rack for mechanically and linearly moving said rack, ball nut means operatively connected with said rack for linear movement therewith, linkage means operatively connecting said ball nut means to the dirigible wheels of the vehicle for vehicle steering, said ball nut means being drivingly secured to said rack for linear movement therewith, rotatable ball screw means operatively extending into said ball nut means, and ball train means operatively interconnecting said ball nut and screw means so that rotation of said screw means linearly drives said ball nut means, and electric motor means drivingly connected to one end of said rack and mounted to one end of said rack housing and operative in response to a predetermined input force for rotatably driving said ball nut screw means to turn said ball screw means for the linear drive of said ball nut resulting in power assist steering.

7. The steering gear of claim 6 wherein a friction drive planetary unit is operatively interposed between said motor and said screw for reducing motor speed and increasing torque.

8. The steering gear of claim 7 and further including threaded means mounting said motor to said housing to preload thrust bearing means operatively interposed between said motor and said planetary unit and between said planetary unit and said housing.

* * * * *